(12) United States Patent
Timmons

(10) Patent No.: US 7,938,061 B2
(45) Date of Patent: May 10, 2011

(54) METHOD AND APPARATUS FOR COMBINING PARTICULATE AND SOFT-SERVE ICE CREAM

(76) Inventor: Tom Timmons, Paducah, KY (US)

( * ) Notice: Subject to any disclaimer, the term of this patent is extended or adjusted under 35 U.S.C. 154(b) by 1039 days.

(21) Appl. No.: 11/592,820

(22) Filed: Nov. 4, 2006

(65) Prior Publication Data
US 2008/0011009 A1 Jan. 17, 2008

(51) Int. Cl.
*A01J 11/00* (2006.01)
(52) U.S. Cl. ............................. 99/452; 99/455
(58) Field of Classification Search ............ 99/452–455
See application file for complete search history.

(56) References Cited

U.S. PATENT DOCUMENTS

| | | | | |
|---|---|---|---|---|
| 2,909,433 | A * | 10/1959 | Morrison | 426/393 |
| 5,098,732 | A * | 3/1992 | Inagaki | 426/565 |
| 5,126,156 | A * | 6/1992 | Jones | 426/418 |
| 5,522,233 | A * | 6/1996 | Nares et al. | 62/193 |
| 6,223,542 | B1 * | 5/2001 | Jones et al. | 62/74 |
| 6,510,890 | B1 * | 1/2003 | Paskach et al. | 165/61 |
| 6,539,743 | B2 * | 4/2003 | Jones | 62/381 |
| 6,555,154 | B2 * | 4/2003 | Jones et al. | 426/524 |
| 7,318,324 | B2 * | 1/2008 | Ulrich et al. | 62/342 |
| 2005/0106301 | A1 * | 5/2005 | Jones | 426/524 |

FOREIGN PATENT DOCUMENTS

WO  WO 2005039303 A2 *  5/2005

* cited by examiner

*Primary Examiner* — Tu B Hoang
*Assistant Examiner* — Hemant Mathew

(57) ABSTRACT

An apparatus and method for combining particulate and soft-serve ice cream is disclosed. The soft serve ice cream is manufactured using N2 vapor.

18 Claims, 3 Drawing Sheets

Ice Cream from Barrel Freezer

METHOD AND APPARATUS FOR COMBINING PARTICULATE AND SOFT-SERVE ICE CREAM

CROSS-REFERENCE TO RELATED APPLICATIONS

This application claims priority to PCT Application No. PCT/US2006/0027115, filed on Jul. 13, 2006. This in claims priority to U.S. Provisional Application No. 60/700,253, filed on Jul. 18, 2005.

FIELD OF THE INVENTION

The present invention relates to ice cream and more particularly to an apparatus and method for combining particulate and soft-serve conventional ice cream.

BACKGROUND OF THE INVENTION

Soft-serve ice cream has existed for many years in many embodiments. Particulate ice cream is newer and not as ubiquitous in the marketplace. However, attempts to combine the two have been rare because the process of making soft-serve ice cream differs substantially from making particulate ice cream. Consequently, a method and apparatus for combining the two entities is desired.

SUMMARY OF THE INVENTION

It is an object of the present invention to provide an apparatus and method for combining soft-serve and particulate ice cream, comprising a cryogenic processor, for use in producing particulate ice cream beads; a mechanism for producing soft-serve ice cream which uses purified N2; and a blending means. It is another object of the present invention to provide a variable speed fruit and nut feeder, for managing and measurably dispersing the beads at a suitable rate for combination with the soft-serve ice cream, and an ingredient feeder, also for combining the beads with the soft-serve ice cream.

These and other objects of the invention will become readily apparent as the following description is read in conjunction with the accompanying drawings.

DETAILED DESCRIPTION OF THE PREFERRED EMBODIMENTS

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

Figure 1:
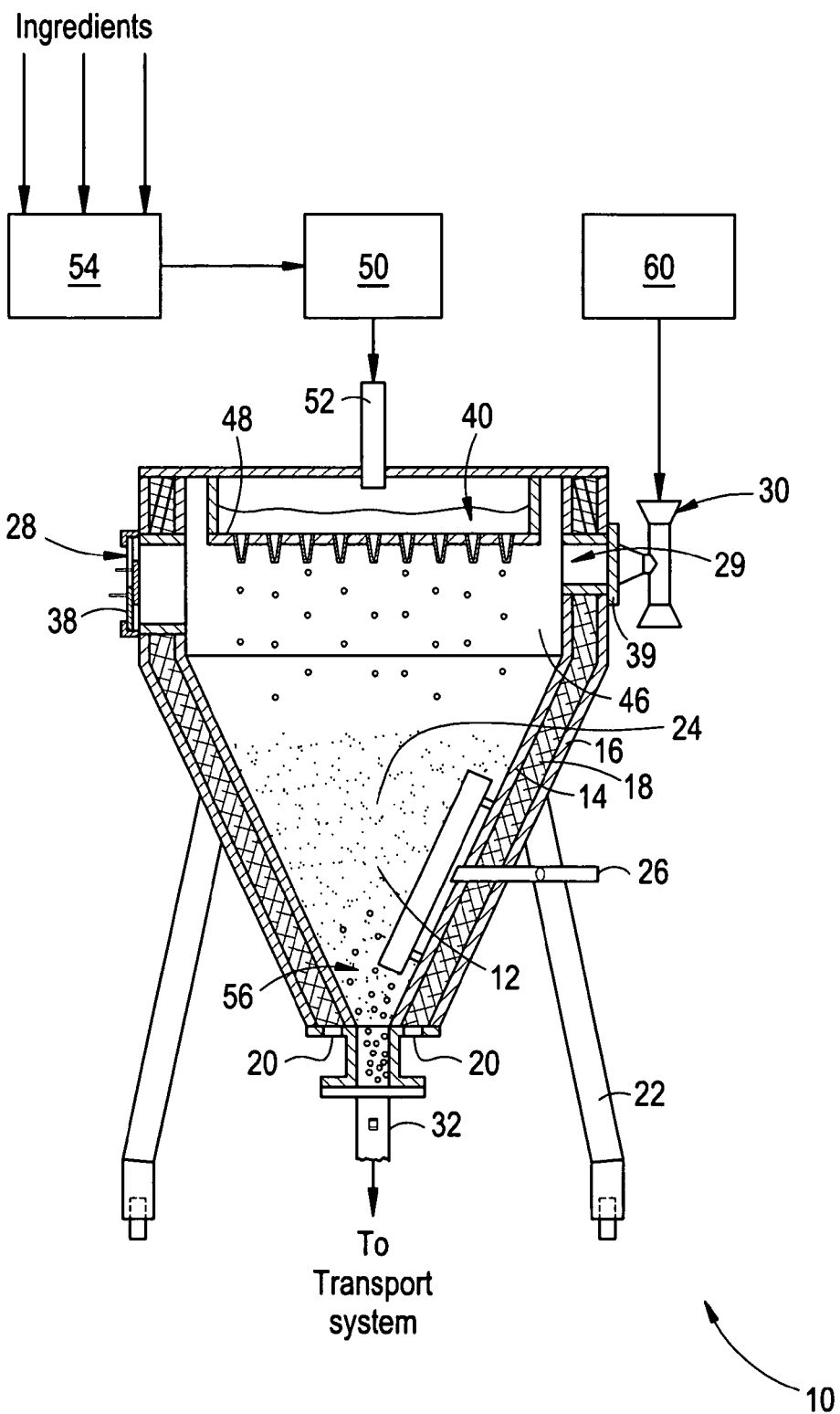
FIG. 1 shows a portion of the present invention.

FIG. 1 shows a cryogenic processor constructed in accordance with the preferred embodiment of the present invention to produce free-flowing beads 56. The fundamental method utilized to produce the product is described in detail in U.S. Pat. No. 5,126,156, which is hereby incorporated by reference.

A cryogenic processor 10 includes a freezing chamber 12 that is most preferably in the form of a conical tank that holds a liquid refrigerant therein. A freezing chamber 12 incorporates an inner shell 14 and an outer shell 16. Insulation 18 is disposed between the inner shell 14 and outer shell 16 in order to increase the thermal efficiency of the chamber 12. Vents 20 are also provided to ventilate the insulated area formed between the shells 14 and 16. The freezing chamber 12 is a free-standing unit supported by legs 22.

A refrigerant 24, preferably liquid nitrogen, enters the freezing chamber 12 by means of refrigerant inlet 26. The refrigerant 24 is introduced into a chamber 12 through the inlet 26 in order to maintain a predetermined level of liquid refrigerant in the freezing chamber because some refrigerant 24 can be lost by evaporation or by other means incidental to production. Gaseous refrigerant that has evaporated from the surface of the liquid refrigerant 24 in freezing chamber 12 primarily vents to the atmosphere through exit port 29 which cooperates with the vacuum assembly 30, which can be in the form of a venturi nozzle. Extraction of the frozen beads occurs through product outlet 32 adapted at the base of the freezing chamber 12.

An ambient air inlet port 28 with adjustment doors 38 and exit port 29 with adjustment doors 39 are provided to adjust the level of gaseous refrigerant which evaporates from the surface of the liquid refrigerant 24 so that excessive pressure is not built up within the processor 10 and freezing of the liquid composition in the feed assembly 40 does not occur.

A feed tray 48 receives liquid composition from a delivery source 50. Typically, a pump (not shown) drives the liquid composition through a delivery tube 52 into the feed tray 48. A premixing device 54 allows several compositions, not all of which must be liquid, such as powdered flavorings or other additives of a size small enough not to cause clogging in the feed assembly 40, to be mixed in predetermined concentrations for delivery to the feed tray 48.

In order to create uniformly sized particulate beads 56 of frozen product, uniformly sized droplets of liquid composition are required to be fed through gas diffusion chamber 46 to freezing chamber 12. However, the present invention can also produce non-uniformly sized chunks of particulate ice cream, and should not be considered as limited exclusively to beads. The feed tray 48 is designed with feed assembly 40 that forms droplets of the desired character, which could include shapes other than beads. The frozen product takes the form of beads or chunks that are formed when the droplets of liquid composition contact the refrigerant vapor in the gas diffusion chamber 46, and subsequently the liquid refrigerant 24 in the freezing chamber 12. After the beads or chunks 56 arc formed, they fall or arc mechanically directed to the bottom of chamber 12. A transport system connects to the bottom of chamber 12 at outlet 32 to carry the beads or chunks 56 of particulate ice cream to a packaging and distribution network for later delivery and consumption.

The vacuum assembly 30 cooperates with air inlet 28 and adjustment doors 38 so that ambient air flows through the inlet and around feed assembly 40 to ensure that no liquid composition freezes therein. This is accomplished by mounting the vacuum assembly 30 and air inlet 28 on opposing sides of the gas diffusion chamber 46 such that the incoming ambient air drawn by the vacuum assembly 30 is aligned with the feed assembly. In this configuration, ambient air flows around the feed assembly warming it to a sufficient temperature to inhibit the formation of frozen liquid composition in the feed assembly flow channels. An air source 60, typically in the form of an air compressor, is attached to vacuum assembly 30 to provide appropriate suction to create the ambient air flow required.

It has been long established practice that when making soft-serve ice cream, the ice cream must be held in a freezing cold "hardening cabinet" for 2, 4, or maybe 8 hours prior to shipping or delivery. However, because the beads or chunks 56 of particulate ice cream of the present invention are frozen at substantially lower temperatures than soft-serve ice cream, such as −180° F., the interspersing of the ultra-cold particulate within the soft-serve negates or greatly reduces this requirement.

Figure 2:
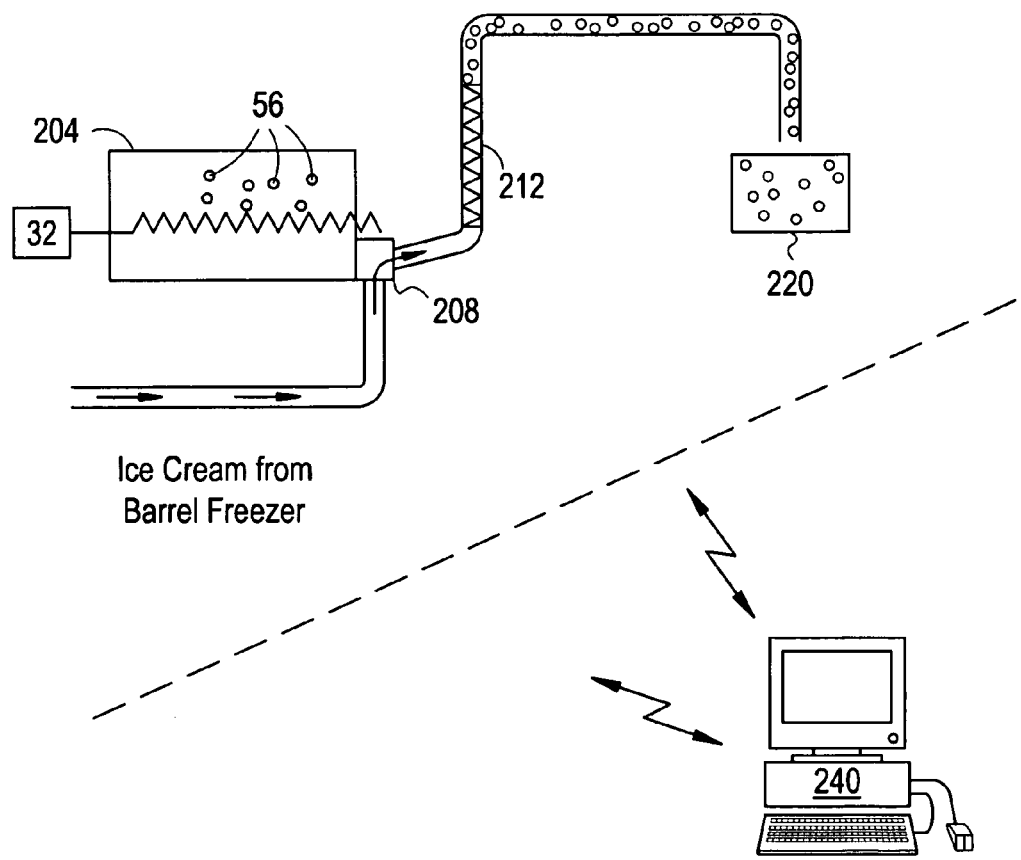
FIG. 2 shows another portion of the present invention.

FIG. 2 shows an exemplary apparatus for blending particulate and soft-serve ice cream into a blended mix. In FIG. 2, the beads 56 are fed into an ingredient feeder such as a variable speed fruit and/or nut feeder 204 either directly from the outlet 32 or from a transport mechanism. In either case, the beads 56 are combined with the semi-frozen soft ice cream from a barrel freezer by a stuffing pump 208, which forces the combination through a static mixer 212 where it is blended and then output into a container 220 either for consumption, shipping, or a hardening cabinet. The container can be either a bowl, a pint cup, or quart container, or perhaps some other type of vessel.

The stuffing pump ensures that a pre-configurable percentage of beads 56 are inserted into the soft-serve soft ice cream, yet regulates the pressure and flow such that the beads 56 are not crushed. In an exemplary embodiment, the stuffing pump 208 feeds back information to a central control device 240 which can automatically make real-time adjustments to both the variable speed fruit and nut feeder 204 as well as a mechanism which controls the flow of soft-serve ice cream from the barrel freezer. An operator may also use the central control device 240 to make manual adjustments.

As shown in FIG. 2, the central control device 240 may be located at a standard room temperature environment separate from the food-preparation environment, and information communicated thereto could be wirelessly or remotely transmitted to the stuffing pump or ingredient feeder 208 and other mechanisms via communication means such as but not limited to WiFi or Bluetooth.

The combination of pump or feeder 208 and mixer 212 can include a lamella pump, but an embodiment also exists in which a specialized screw auger feeds the beads 56 and moves the finished combined product to the package 220. This embodiment incorporates a dosing screw to induce the proper amount of beads 56, and a traveling screw that will move the blended product to the package 220 at a higher pressure than standard ice cream pumps. All the above items are carefully calibrated to not crush the beads or chunks 56 during the blending process.

To ensure maximum coldness, the beads or chunks 56 of particulate ice cream can be stored or dipped in LN2 prior to introduction into the feeder 208 and mixer 212. This has the effect of ensuring that the beads or chunks 56 stay below a temperature of −180° F., which is useful when being combined with the soft-serve ice cream which will be discussed in more detail below.

Figure 3:
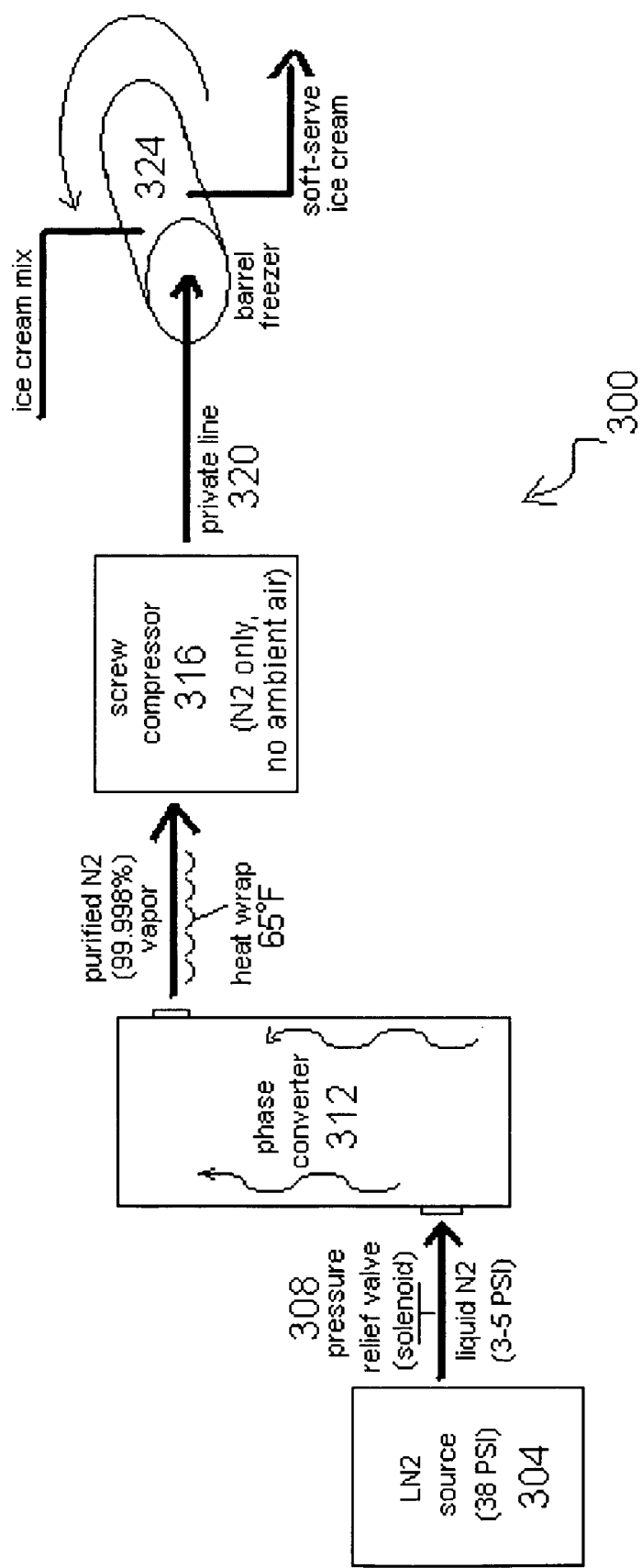
FIG. 3 shows yet another portion of the present invention.

As shown in FIG. 3, the soft-serve ice cream of the present invention can be manufactured using an arrangement 300 of cryogenic equipment including a phase converter 312 in line with a compressor 316. The phase converter 312 receives liquid N2 (LN2) from an LN2 source 304 and outputs N2 vapor having absolutely no LN2 therein. The purity level of the LN2 inside the source 304 is 99.998% N2. However, N2 vapor has significantly less moisture, impurities, and humidity than LN2. Consequently, the N2 vapor delivered to the compressor 316 is extremely unlikely to introduce impurities into the resulting ice cream. Also, because no moisture or humidity is present at the N2, the likelihood of the air brought into the barrel freezer 324 forming ice crystals is reduced.

A pressure relief valve 308 is located between the LN2 source 304 and the phase converter 312, for the purpose of stepping down the pressure from the LN2 source prior to entry into the phase converter 312. Because of its extreme low temperature (−320° F.) and extreme high pressure (38-44 PSI) inside the LN2 source, the N2 emitted therefrom will naturally revert to a vapor state as soon as it comes in contact with normal ambient temperatures and regular atmospheric pressures, such as while inside the phase converter 312. Reducing pressure from the LN2 source 304 before reaching the phase converter 312 has the advantage of ensuring that none of the N2 vapor that reaches the compressor 316 has any chance of returning to a liquid stage. Accordingly, no additional or artificial pressure is needed to accelerate the transformation from liquid to vapor.

The phase converter 312 has a series of fins, baffles, or manifolds so that its interior contents can have as much (controlled and contained) exposure as possible to normal non-cryogenic room temperatures. The phase converter also takes advantage of the natural tendency of N2 vapor to rise as it is warmed. Specifically, as shown in FIG. 3, the LN2 enters at the bottom of phase converter 312, while the N2 vapor exits at the top.

Also as shown in FIG. 3, a heat wrap is located at the outlet of the phase converter 312 to bring the temperature of the N2 vapor to approximately +65° F. This heat wrap ensures temperature stability of the purified N2 vapor being fed into the compressor 316. Many compressors do not have the capability of handling cryogenic temperatures such as −180° F., although the present invention further comprises a specialized compressor suitable for cryogenic temperatures, as will be discussed below. The N2 vapor is restored to +65° F. and then directed into the input of a compressor 316, which in turn operates a barrel freezer 324 through a secured (private) line 320. The private line 320 is specially sealed to prevent any possibility of leakage or introduction of outside elements into the N2 vapor. Such private routing has the advantage of avoiding the introduction of outside moisture.

An additional feature of the present invention is its ability to reduce the formation of ice crystals, and also reduce the sizes of those that do form. Large ice crystals dilute the taste and quality of the resulting ice cream. The colder the soft-serve ice cream is kept in the manufacturing, the less likely it will be to form ice crystals from the moisture that is in normal air, or the ice cream mix itself containing some water. The present invention reduces this problem by adding the beads and chunks 56 of particulate ice cream to the soft-serve ice cream while the beads are at approximately −180° F. or colder, which renders the resulting blended product (FIG. 2) into a much colder temperature, such as 0° F. and below, than the temperature at which the soft-serve ice cream is output from the barrel freezer 324. These colder temperatures, such as 0° F. and below, can reduce and sometimes entirely eliminate the formation of unwanted ice crystals.

In an alternate embodiment, trace amounts of non-heated N2 directly from the LN2 source are introduced directly into the barrel freezer, without being compressed. The amount of N2 is carefully calibrated or metered so as to achieve a specific overrun (percentage of air within the finished ice cream product). This modification saves the barrel freezer from having to do as much work in cooling the ice cream to the desired temperatures.

In an additional alternate embodiment, a specialized compressor is used which, as stated, has the ability to withstand cryogenic temperatures input thereto. This compressor routes N2 vapor directly into the barrel freezer 324 at cryogenic temperatures (in controlled dosages), so that the barrel freezer 324 is able to achieve a desired overrun. This embodiment also saves the barrel freezer from having to do as much work in cooling the ice cream to the desired temperatures.

Within the present invention, a screw compressor 316 is employed in conjunction with the barrel freezer 324, rather than a reciprocating compressor. Although reciprocating compressors are commonly used in ice cream production, they can introduce a minute amount of oil into the coolant that is being compressed. With the reciprocating compressor, this oil could conceivably make its way into the ice cream products, albeit in trace amounts that are well below health and purity safety limits. Nonetheless, even a trace amount of oil in an ice cream product could affect its taste. Conversely, screw compressors require 20-30% less oil than a reciprocating compressor. Thus, substituting a screw compressor for a reciprocating compressor reduces this problem.

The screw compressor 316 of the present invention is made so the screws are pressurized so any oil that is present in oil journals will be pushed away from the stream of air being compressed, and not sucked inward. The screw compressor 316 has a first combination oil separator/compressor system that eliminates any remaining oil from the air stream. Additionally, the screw compressor 316 also has a pressure tank for storage and additional oil (second) separation. Any oil that may get past the built-in (first) separator will be deposited into the bottom of the pressure tank and will be discharged entirely. Meanwhile, the system-usable N2 is discharged from the top of the pressure tank. There is an additional (third) oil separator after the pressure tank, that should any oil be present, will also be discharged. Finally, there is also a (fourth) oil separator in the barrel freezer (not shown), which is a bowl-shaped device.

The N2 is discharged from the compressor and directed to the side of the tank so that any oil or moisture will come in direct contacts therewith. Accordingly, oil will stay on the side of the tank, then travel to the bottom of the tank. An opening at the bottom of the tank allows the collected oil to enter a float chamber, external to the tank. When the chamber is filled, a float device raises to activate a switch, a solenoid is opened and the N2 pressure in the tank drives the oil out of the chamber. When the level in the chamber is lowered, the float device drops and the switch is deactivated, the solenoid closes and the process starts all over again. The pressurized N2 thus rises to the top opening in an "oil free" state, and enters the private line to the barrel machine 324.

The various aspects of the present invention has been described in detail with particular reference to preferred embodiments thereof, but it will be understood that variations and modifications can be effected within the spirit and scope of the invention as described herein. It is anticipated that various changes may be made in the arrangement and operation of the system of the present invention without departing from the spirit and scope of the invention, as defined by the following claims.

What is claimed is:

1. An apparatus for manufacturing combined conventional and particulate ice cream, comprising:
   a cryogenic processor, for use in producing particulate ice cream beads;
   an ice cream mechanism for producing soft-serve ice cream wherein said ice cream mechanism comprises a source of liquid nitrogen, a phase converter, a compressor, a barrel freezer, and a pressure relief valve connected between said liquid nitrogen source and said phase converter, for stepping down a pressure from the liquid nitrogen source prior to entry into the phase converter, wherein said phase converter outputs nitrogen vapor that is devoid of liquid and is entirely vapor; and
   a blending apparatus.

2. The apparatus of claim 1, wherein said barrel freezer is connected to said compressor by a secured private line.

3. The apparatus of claim 1, wherein said phase converter has a series of fins, baffles, or manifolds so that its interior contents are exposed to non-cryogenic room temperatures.

4. The apparatus of claim 1, wherein upon being output from said phase converter, the nitrogen vapor is brought to +65° F. and then directed into an input of the compressor through the secured private line.

5. The apparatus of claim 4, wherein said secured private line is specially sealed to prevent any possibility of leakage or introduction of outside elements into the nitrogen vapor.

6. The apparatus of claim 4, further comprising:
   a heat wrap, located at an outlet of said phase converter, for assisting in bringing the temperature of the nitrogen vapor to approximately +65° F.

7. The apparatus of claim 1, wherein said compressor is a screw compressor.

8. The apparatus of claim 7, wherein said screw compressor has an oil separator for eliminating any remaining oil from an air stream.

9. The apparatus of claim 7, wherein said screw compressor has a pressure tank for storage and additional oil separation.

10. The apparatus of claim 7, wherein said screw compressor has an additional oil separator located after a pressure tank.

11. The apparatus of claim 7, wherein said barrel freezer has a bowl-shaped oil separator located therein.

12. The apparatus of claim 1, wherein said blending apparatus further comprises:
    a variable speed fruit and nut feeder, for managing and measurably dispersing said beads at a suitable rate for combination with said soft-serve ice cream.

13. The apparatus of claim 12, wherein said variable speed fruit and nut feeder forces the combination through a static mixer where it is blended and then output into a container either for consumption, shipping, or a hardening cabinet.

14. The apparatus of claim 1 wherein said blending apparatus further comprises:
    a stuffing pump, for combining said beads with said soft-serve ice cream.

15. The apparatus of claim 14, wherein said stuffing pump forces said beads and said soft-serve ice cream through a static mixer where it is blended and then output into a container either for consumption, shipping, or a hardening cabinet.

16. The apparatus of claim 14, wherein said stuffing pump ensures that a pre-configurable percentage of said beads are inserted into the soft-serve soft ice cream, yet regulates a pressure and flow such that the beads are not crushed.

17. An apparatus for manufacturing combined conventional and particulate ice cream, comprising:
    a cryogenic processor, for use in producing particulate ice cream beads;
    an ice cream mechanism for producing soft-serve ice cream comprising a source of liquid nitrogen, a phase converter, a compressor adapted to receive and output air at cryogenic temperatures, and a barrel freezer, wherein said ice cream mechanism further comprises a pressure relief valve connected between said liquid nitrogen source and said phase converter, for stepping from the liquid nitrogen source prior to entry into the phase converter and wherein said phase converter outputs nitrogen vapor that is devoid of liquid and is entirely vapor; and
    a blending apparatus.

18. The apparatus of claim 17, wherein said barrel freezer is connected to said compressor by a secured private line.

* * * * *